J. S. CULBERTSON.
DITCH OR DRAIN FORMING IMPLEMENT.
APPLICATION FILED MAY 25, 1917.
1,258,749.
Patented Mar. 12, 1918.
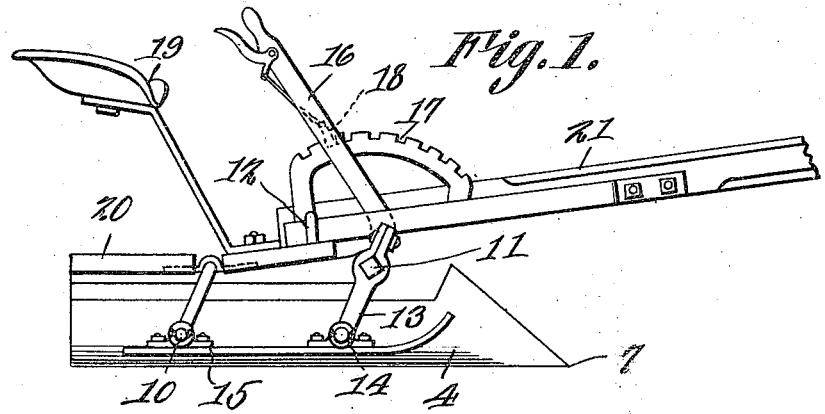
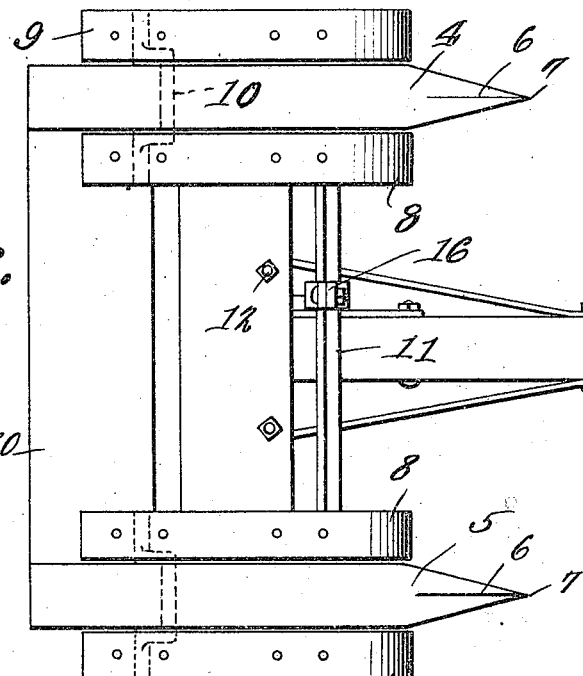
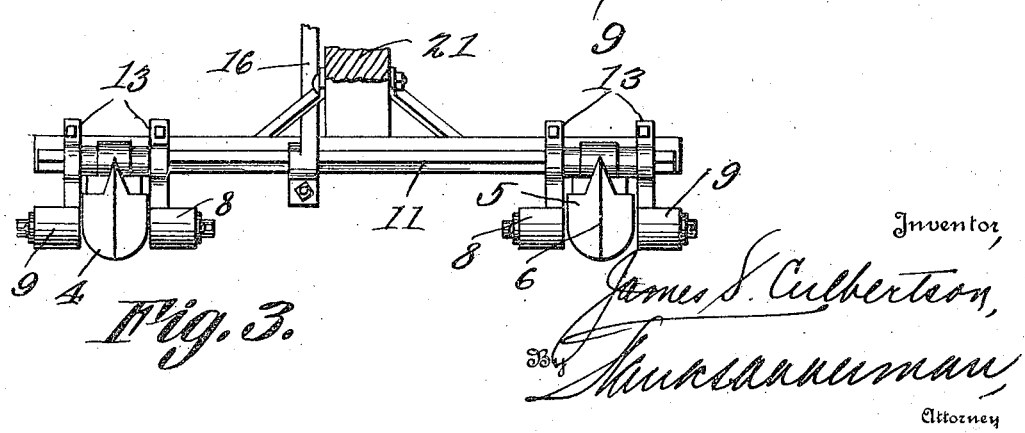
Inventor,
James S. Culbertson,
Attorney

UNITED STATES PATENT OFFICE.

JAMES S. CULBERTSON, OF BAKER, OREGON.

DITCH OR DRAIN FORMING IMPLEMENT.

1,258,749. Specification of Letters Patent. Patented Mar. 12, 1918.

Application filed May 25, 1917. Serial No. 170,949.

*To all whom it may concern:*

Be it known that I, JAMES S. CULBERTSON, a citizen of the United States of America, and resident of Baker, in the county of Baker and State of Oregon, have invented certain new and useful Improvements in Ditch or Drain Forming Implements, of which the following is a specification.

This invention relates to ditch or drain forming implements and particularly to means for pressing soil laterally and downwardly to form drain-ways, means being provided for preventing undue surface disturbances adjacent the sides of the drainway.

A further object of this invention is to provide a machine adapted to penetrate the soil and to laterally crowd or press the soil, so as to displace it to a degree to permit the pressing member to travel while at the same time creating a clearance which will form a passage or drain-way as for instance in forming the laterals of irrigating systems for watering fields of alfalfa or other grass, or vegetation, and in addition thereto, provision of runners coacting with the soil displacing members which are operative to smooth the upper surface of the soil adjacent the displaced portions and furthermore to provide means for moving the pressing or smoothing members with relation to the soil displacing members so that the soil displacing members may be permitted to operate to different depths; the invention furthermore contemplating the provision of means whereby the said pressing members may constitute runners or supports by which the implement can be transported from one place to another without exposing the soil over which it is drawn to the action of the drain-forming members.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a side elevation of an implement embodying the invention;

Fig. 2 illustrates a top plan view; and

Fig. 3 illustrates a front view thereof.

In these drawings 4 and 5 denote the soil displacing members and as the construction of these members is the same, a description of one will suffice as a disclosure of the construction of both. The said soil displacing members, each comprise a body which is U-shaped in cross section, the same being constructed by cutting away a portion of the stock of which it is formed on a line 6 and in bending the sides of the member so that the ends of the sides converge at the point 7 to produce a soil penetrating point or bit which constitutes the entering wedge as the implement is being drawn and the tapered point splits the soil and presses it apart forming a smooth and even firmly packed surface at the bottom and sides of the ditch so that water may flow therein uninterruptedly. Provision is made for preventing dislodgment of soil after the members have formed the ditch, the said provision comprising the shoes 8 and 9 arranged in pairs and adapted to coact with the soil displacing member to pack the soil so that it will not readily be displaced as stated. Furthermore, the shoes may be used as supports for the apparatus when it is being transported from place to place and when the soil displacing members are not to be used. To that end, the shoes are mounted on cranks 10 near their rear ends and near their forward ends, a shaft 11 is suitably journaled in the frame 12 and the said shaft carries arms 13 which are journaled in bearings 14 on the said shoe, it being understood that the crank 10 is likewise journaled in bearings 15 on the shoes. The shaft 11 is partially rotated by the operating handle 16 and by the employment of a toothed rack 17 and a dog 18, and the handle 16 may be held at different positions of adjustment.

The frame 12 supports a seat 19 and a filler 20 connects the two soil displacing members for holding them in operative relation to each other, the said filling board being carried by the frame.

By reason of the adjustability of the shoes, the depth of the ditches may be determined, since the shoes will regulate the depth to which the soil displacing elements may penetrate.

The furrow forming members operate so that they do not uproot or injure sod or grass roots and particularly where it is used in land having alfalfa growth, there is no uprooting of the plant and no injurious effect is apparent.

The tongue 21 is rigidly connected to the frame 12 and this insures an even smooth draft without permitting any jumping of the machine in the thickest of alfalfa sod.

By reason of the fact that the shoes are supported so that they may be thrown rearwardly when raised, the accumulation of trash or old hay over the cutting points of the furrowers or soil displacing elements is obviated.

The construction, operation and advantages will it is thought, be understood from the foregoing description, it being understood that various changes may be made in the details of construction without departing from the scope of the invention as set forth in the appended claim.

I claim—

In a furrower, soil displacing member, a frame, adjustable shoes on each side of each displacing member, a crank carried by the frame, and supporting one end of the shoes, a shaft journaled to the frame, arms journaled in bearings in the said shoe, said arms being carried by the shaft, means for rotating the shaft to raise or lower the shoes, and a filling board connecting the said soil displacing members.

JAMES S. CULBERTSON.

Copies of this patent may be obtained for five cents each, by addressing the "Commissioner of Patents, Washington, D. C."